US012770916B2

(12) United States Patent
Hashimoto et al.

(10) Patent No.: US 12,770,916 B2
(45) Date of Patent: Oct. 20, 2026

(54) ION CONDUCTIVE SOLID AND ALL-SOLID-STATE BATTERY

(71) Applicant: CANON OPTRON, INC., Ibaraki (JP)

(72) Inventors: Saori Hashimoto, Tochigi (JP); Yoshitaka Shiba, Tochigi (JP); Noriko Sakamoto, Tochigi (JP); Takeshi Kobayashi, Ibaraki (JP)

(73) Assignee: CANON OPTRON, INC., Ibaraki (JP)

( * ) Notice: Subject to any disclaimer, the term of this patent is extended or adjusted under 35 U.S.C. 154(b) by 548 days.

(21) Appl. No.: 18/460,956

(22) Filed: Sep. 5, 2023

(65) Prior Publication Data

US 2023/0411683 A1 Dec. 21, 2023

Related U.S. Application Data

(63) Continuation of application No. PCT/JP2021/045280, filed on Dec. 9, 2021.

(30) Foreign Application Priority Data

May 31, 2021 (JP) ................................. 2021-091174

(51) Int. Cl.
*H01M 10/0562* (2010.01)
*H01M 4/131* (2010.01)

(52) U.S. Cl.
CPC ....... *H01M 10/0562* (2013.01); *H01M 4/131* (2013.01)

(58) Field of Classification Search
CPC .......................... H01M 10/0562; H01M 4/131
See application file for complete search history.

(56) References Cited

U.S. PATENT DOCUMENTS

2022/0302497 A1 9/2022 Shiba et al.

FOREIGN PATENT DOCUMENTS

| | | | |
|---|---|---|---|
| DE | 11 2020 006 232 | T5 | 10/2022 |
| JP | 2017-91953 | A | 5/2017 |
| JP | 2017-91955 | A | 5/2017 |
| WO | 2022/254753 | A1 | 12/2022 |
| WO | 2022/254754 | A1 | 12/2022 |
| WO | 2022/254755 | A1 | 12/2022 |
| WO | 2022/254756 | A1 | 12/2022 |
| WO | 2022/254757 | A1 | 12/2022 |

OTHER PUBLICATIONS

International Search Report in International Application No. PCT/JP2021/045280 (Feb. 2022).

Toyoki Okumura et al., "All-Solid-State Lithium-Ion Battery Using Li2.2C0.8B0.2O3 Electrolyte," 288 Solid State Ionics 248-252 (2016).

Shiba et al., U.S. Appl. No. 18/460,986, filed Sep. 5, 2023.

Kobayashi et al., U.S. Appl. No. 18/242,209, filed Sep. 5, 2023.

Shiba et al., U.S. Appl. No. 18/242,204, filed Sep. 5, 2023.

Hashimoto et al., U.S. Appl. No. 18/460,974, filed Sep. 5, 2023.

Official Letter in German Application No. 11 2021 007 743.0 (Jul. 2026).

Toyoki Okumura et al., "Zr- and Ce-Doped $Li_6$ $Y(BO_3)_3$ Electrolyte for All-Solid-State Lithium-Ion Battery," 11 RSC Adv. 16530-16536 (2021).

Naoki Hamao et al., "Li-Ion Conductivity and Crystal Structure of Garnet-Type $Li_{6\ .5}La_3M_{1\ .5}\ Ta_{0\ .5}O_{12}$ (M =Hf, Sn) Oxides," 125(4) J. Ceram. Soc. Jpn. 272-275 (2017).

First Office Action in Chinese Application No. 202180096448.6 (Aug. 2026).

*Primary Examiner* — Sarah A. Slifka
(74) *Attorney, Agent, or Firm* — Venable LLP

(57) ABSTRACT

An ion conductive solid includes an oxide represented by the general formula $Li_{6-x-y-z}Y_{1-x-y-z}Hf_xZr_yCe_zB_3O_9$, and the solid-state battery has at least a positive electrode, a negative electrode, and an electrolyte, and at least one element of the group consisting of the positive electrode, the negative electrode, and the electrolyte includes the ion conductive solid. (In the formula, x, y, and z are real numbers that satisfy the relationships $0.005 \leq x \leq 0.800$, $0.000 \leq y \leq 0.400$, $0.000 \leq z \leq 0.400$, and $0.005 \leq x+y+z \leq 1.000$.)

8 Claims, No Drawings

ION CONDUCTIVE SOLID AND ALL-SOLID-STATE BATTERY

CROSS REFERENCE TO RELATED APPLICATIONS

This application is a Continuation of PCT International Application No. PCT/JP2021/045280, filed on Dec. 9, 2021, which is claiming priority of Japanese Patent Application No. 2021-091174, filed on May 31, 2021, all of which are hereby expressly incorporated by reference into the present application.

BACKGROUND OF THE INVENTION

Field of the Invention

The present disclosure relates to an ion conductive solid and an all-solid-state battery.

Description of the Related Art

Conventionally, light-weight and high-capacity lithium ion secondary batteries have been included in mobile devices such as smartphones and notebook computers, and transport equipment such as electric vehicles and hybrid electric vehicles.

However, since liquids containing combustible solvents have been used as electrolytes in conventional lithium ion secondary batteries, the leakage of the combustible solvents and ignition in the case of the short circuit of the batteries have been feared. Thus, secondary batteries using, as electrolytes, ion conductive solids different from the liquid electrolytes, to secure safety, have received attention in recent years. Such secondary batteries have been called all-solid-state batteries.

Solid electrolytes such as oxide-based solid electrolytes and sulfide-based solid electrolytes have been widely known as the electrolytes used in the all-solid-state batteries. Among them, the oxide-based solid electrolytes do not react with moisture in atmosphere, and do not generate hydrogen sulfide. Thus, the oxide-based solid electrolytes are safer than the sulfide-based solid electrolytes.

Such an all-solid-state battery includes: a positive electrode comprising a positive electrode active material; a negative electrode comprising a negative electrode active material; an electrolyte that is placed between the positive electrode and the negative electrode, and includes an ion conductive solid; and, if necessary, a current collector (the positive electrode active material and the negative electrode active material are collectively referred to as "electrode active material"). In a case in which the all-solid-state battery is produced using an oxide-based solid electrolyte, heat treatment is performed to reduce the contact resistance between the particles of an oxide-based material included in the solid electrolyte. However, in a conventional oxide-based solid electrolyte, a high temperature of 900° C. or more is required in the heat treatment, and the solid electrolyte and the electrode active material may therefore react to form a high-resistance phase. The high-resistance phase may lead to a decrease in the ionic conductivity of the ion conductive solid, and in turn to a decrease in the output of the all-solid-state battery.

Examples of oxide-based solid electrolytes that can be produced by heat treatment at a temperature of less than 900° C. include $Li_2+xC_{1-x}B_xO_3$(Solid State Ionic 288 (2016) 248-252).

SUMMARY OF THE INVENTION

The present disclosure provides: an ion conductive solid that can be produced by heat treatment at low temperature, and that exhibits a high ionic conductivity; and an all-solid-state battery comprising the ion conductive solid.

An ion conductive solid of the present disclosure is an ion conductive solid comprising an oxide represented by formula $Li_{6-x-y-z}Y_{1-x-y-z}Hf_xZr_yCe_zB_3O_9$, wherein in the formula, x is 0.005≤x≤0.800, y is 0.000≤y≤0.400, z is 0.000≤z≤0.400, and x, y, and z are real numbers satisfying 0.005≤x+y+z≤1.000.

Further, an all-solid-state battery of the present disclosure is an all-solid-state battery, comprising at least:

a positive electrode;

a negative electrode; and an electrolyte, wherein at least one selected from the group consisting of the positive electrode, the negative electrode, and the electrolyte comprises the ion conductive solid of present disclosure.

In accordance with one aspect of the present disclosure, there can be obtained: an ion conductive solid that can be produced by heat treatment at low temperature, and that exhibits a high ionic conductivity; and an all-solid-state battery comprising the ion conductive solid. Further features of the present disclosure will become apparent from the following description of exemplary embodiments.

DESCRIPTION OF THE EMBODIMENTS

In the present disclosure, a description of "XX or more and YY or less" or "XX to YY" representing a numerical range means a numerical range including lower and upper limits which are end points, unless otherwise specified. Also, when a numerical range is described in a stepwise manner, the upper and lower limits of each numerical range can be arbitrarily combined.

Further, in the present disclosure, a "solid" refers to the state of matter having certain shape and volume, in the three states of matter, and a powder state is included in the "solid".

An ion conductive solid of the present disclosure is an ion conductive solid comprising an oxide represented by general formula $Li_{6-x-y-z}Y_{1-x-y-z}Hf_xZr_yCe_zB_3O_9$, wherein in the formula, x is 0.005≤x≤0.800, y is 0.000≤y≤0.400, z is 0.000≤z≤0.400, and x, y, and z are real numbers satisfying 0.005≤x+y+z≤1.000.

As the reason why the ion conductivity is improved in the ion conductive solid including an oxide represented by the general formula, the present inventors presume as follows.

When a part of Y of a trivalent metal element is substituted with Hf of a tetravalent metal element within the scope of the present disclosure, substitution between elements with different valences adjusts the balance of electric charges, resulting in a loss of $Li^+$ in the crystal lattice. The surrounding $Li^+$ moves for filling the loss of $Li^+$, and hence the ion conductivity is improved.

The ion conductive solid of the present disclosure preferably includes a monoclinic type crystalline structure. With an ion conductive solid including a monoclinic type crystalline structure, when a part of $Y^{3+}$ is substituted with Hf of a metal element with a larger valence than that of $Y^{3+}$ within the scope of the present disclosure, the lattice constant is affected as compared with $Li_6YB_3O_9$ not including Hf (i.e., the case where x=0.000). Accordingly, the lattice volume is also affected, and further, the ion conductivity can also be affected.

The diffraction peak generated in the vicinity of 2θ=28° in the X-ray diffraction analysis using a CuKα line (which will be hereinafter also referred to simply as "XRD") may vary according to the composition of the ion conductive solid.

The ion conductive solid of the present disclosure preferably has a diffraction peak within the range of 27.95°≤2θ≤28.10° in XRD using a CuKα line, more preferably has a diffraction peak within the range of 27.98°≤2θ≤28.03°, and further preferably has a diffraction peak within the range of 27.99°≤2θ≤28.02°.

The position of the diffraction peak generated in the vicinity of 2θ=28° in XRD using a CuKα line can be controlled by adjusting the values of x, y, and z in the general formula.

The ion conductive solid of the present disclosure satisfies preferably 753.00 $Å^3$≤V≤756.00 $Å^3$, more preferably 753.55 $Å^3$V≤755.76 $Å^3$, and further preferably 753.55 Å≤V≤755.50 $Å^3$, where V represents the lattice volume of the ion conductive solid.

The lattice volume of the ion conductive solid can be controlled by adjusting the values of x, y, and z in the general formula.

The x in the general formula is a real number satisfying 0.005≤x≤0.800.

The x satisfies 0.005 x≤0.800, preferably satisfies 0.010≤x≤0.800, more preferably satisfies 0.010≤x≤0.400, further preferably satisfies 0.010≤x≤0.100, in particular preferably satisfies 0.010≤x≤0.050, and extremely preferably satisfies 0.010≤x≤0.030.

The y in the general formula is a real number satisfying 0.000≤y≤0.400.

The y satisfies 0.000≤y≤0.400, preferably satisfies 0.010≤y≤0.400, more preferably satisfies 0.010≤y≤0.200, further preferably satisfies 0.010≤y≤0.100, and in particular preferably satisfies 0.030≤y≤0.100.

In the general formula, z is a real number satisfying 0.000≤z≤0.400.

The z satisfies 0.000≤z≤0.400, preferably satisfies 0.010≤z≤0.400, more preferably satisfies 0.010≤z≤0.200, further preferably satisfies 0.010 z≤0.100, and in particular preferably satisfies 0.010≤z≤0.030.

In the general formula, x+y+z is a real number satisfying 0.005≤x+y+z<1.000.

The x+y+z satisfies 0.005≤x+y+z<1.000, preferably satisfies 0.010≤x+y+z<1.000, more preferably satisfies 0.010≤x+y+z≤0.900, further preferably satisfies 0.010≤x+y+z≤0.400, in particular preferably satisfies 0.010≤x+y+z≤0.300, extremely preferably satisfies 0.010≤x+y+z<0.300, and especially preferably satisfies 0.010≤x+y+z<0.200.

Examples of the ion conductive solid of the present disclosure may include the following embodiments. However, the present disclosure is not limited to the embodiments.

(1)

The x may satisfy 0.010≤x≤0.100, y may satisfy 0.000≤y≤0.200, z may satisfy 0.000≤z≤0.200, and x, y, and z may satisfy 0.010≤x+y+z<0.300.

(2)

The x may satisfy 0.010≤x≤0.030, y may satisfy 0.030≤y≤0.100, z may satisfy 0.010≤z≤0.030, and x, y, and z may satisfy 0.050≤x+y+z<0.160.

Then, a method for producing the ion conductive solid of the present disclosure will be described.

The method for producing the ion conductive solid of the present disclosure can be set as the following aspects. However, the present disclosure is not limited thereto.

A method for producing an ion conductive solid including an oxide represented by general formula $Li_{6-x-y-z}Y_{1-x-y-z}Hf_xZr_yCe_zB_3O_9$, can have a primary baking step of subjecting the starting materials mixed so as to obtain the oxide represented by the general formula to a heat treatment at a temperature of less than the melting point of the oxide.

In the formula, x is a real number satisfying 0.005≤x≤0.800, y is a real number satisfying 0.000≤y≤0.400, z is a real number satisfying 0.000≤z≤0.400, and x, y, and z are real numbers satisfying 0.005≤x+y+z<1.000.

The method for producing the ion conductive solid of the present disclosure can include a primary baking step of weighing/mixing starting materials so as to obtain the oxide expressed by the above formula, and subjecting the starting materials to a heat treatment at a temperature below the melting point of the oxide, thereby producing an ion conductive solid comprising the oxide. Further, the producing method may include a secondary baking step of heat-treating the obtained ion conductive solid comprising the oxide at a temperature below the melting point of the oxide, and producing a sintered compact of the ion conductive solid comprising the oxide.

Below, the method for producing an ion conductive solid of the present disclosure including the primary baking step, and the secondary baking step will be described in detail. However, the present disclosure is not limited to the following producing method.

Primary Baking Step

At the primary baking step, starting materials such as $Li_3BO_3$, $H_3BO_3$, $Y_2O_3$, $ZrO_2$, $CeO_2$, and $HfO_2$ of the chemical reagent grade are weighed in their respective stoichiometric amounts, and are mixed so as to achieve general formula $Li_{6-x-y-z}Y_{1-x-y-z}Hf_xZr_yCe_zB_3O_9$ (where x is a real number satisfying 0.005≤x≤0.800, y is a real number satisfying 0.000≤y≤0.400, z is a real number satisfying 0.000≤z≤0.400, and x, y, and z are real numbers satisfying 0.005≤x+y+z<1.000).

An apparatus used in the mixture is not particularly limited. For example, a pulverizing-type mixer such as a planetary ball mill can be used as the apparatus. The material and capacity of a container used in the mixture, and the material and diameter of the balls are not particularly limited, and can be selected as appropriate depending on the kinds and amounts of the starting materials used. As an example, a 45 mL container made of zirconia, and balls that have a diameter of 5 mm and are made of zirconia can be used. Moreover, the conditions of mixture treatment are not particularly limited but can be set at, for example, a rotation number of 50 rpm to 2000 rpm, and a time of 10 minutes to 60 minutes.

The powder mixture of each of the starting materials described above is obtained by the mixture treatment, and the obtained powder mixture is pressure-molded to make pellets. A known pressure molding method such as a cold uniaxial molding method or a cold isostatic pressure molding method can be used as a pressure molding method. The condition of the pressure molding in the primary baking step is not particularly limited but can be set at, for example, a pressure of 100 MPa to 200 MPa.

For the resulting pellet, using a baking apparatus such as an atmospheric baking apparatus, baking is performed. The temperature at which primary baking is performed for performing solid phase synthesis has no particular restriction so long as it is less than the melting point of an ion conductive solid represented by the Formula $Li_{6-x-y-z}$ $Y_{1-x-y-z}Hf_xZr_yCe_zB_3O_9$. The temperature for performing primary baking can be set at, for example, less than 700° C., 680° C. or less, 670° C. or less, 660° C. or less, or 650° C. or less, and can be set at, for example, 500° C. or more. The numerical value ranges can be arbitrarily combined. At a temperature within the foregoing ranges, solid phase synthesis can be sufficiently performed. The time of the primary baking step has no particular restriction, and can be set at, for example, about 700 minutes to 750 minutes. By the primary baking step, it is possible to produce an ion conductive solid comprising the oxide represented by the Formula $Li_{6-x-y-z}Y_{1-x-y-z}Hf_xZr_yCe_zB_3O_9$. By pulverizing the ion conductive solid comprising the oxide using a mortar/pestle or a planetary mill, it is also possible to obtain a powder of the ion conductive solid comprising the oxide.

Secondary Baking Step

At the secondary baking step, at least one selected from the group consisting of the ion conductive solid comprising the oxide, and the powder of the ion conductive solid comprising the oxide obtained at the primary baking step is pressure molded, and baked, thereby obtaining a sintered compact of the ion conductive solid comprising the oxide of the present disclosure.

The pressure molding and the secondary baking may be performed at the same time using spark plasma sintering (which will also be hereinafter referred to as simply "SPS"), hot press, or the like. Alternatively, after producing a pellet with cold uniaxial molding, the secondary baking may be performed in an atmospheric atmosphere, an oxidizing atmosphere, a reducing atmosphere, or the like. Under the foregoing conditions, without causing melting due to the heat treatment, an ion conductive solid with a high ion conductivity can be obtained. The conditions for pressure molding at the secondary baking step has no particular restriction, and can be set at a pressure of, for example, 10 MPa to 100 MPa.

The temperature at which the secondary baking is performed is less than the melting point of the ion conductive solid represented by the Formula $Li_{6-x-y-z}Y_{1-x-y-z}Hf_xZr_yCe_zB_3O_9$. The temperature for performing the secondary baking is preferably less than 700° C., more preferably 680° C. or less, further preferably 670° C. or less, and in particular preferably 660° C. or less. The lower limit of the temperature has no particular restriction, is more preferably lower, and is, for example, 500° C. or more. The numerical value ranges can be arbitrarily combined, and can be set within the range of, for example, 500° C. or more and less than 700° C. Within the foregoing range, at the secondary baking step, the ion conductive solid comprising the oxide of the present disclosure can be prevented from being molten or dissolved, so that a sintered compact of the ion conductive solid comprising the oxide of the present disclosure can be obtained.

The time of the secondary baking step can be appropriately changed according to the temperature of the secondary baking, or the like, and is preferably 24 hours or less, and may be set at 1 hour or less. The time of the secondary baking step may be set at, for example, 5 minutes or more.

The method for cooling the sintered compact of the ion conductive solid comprising the oxide of the present disclosure obtained by the secondary baking step has no particular restriction. Natural cooling (intra-furnace cooling) may be performed, rapid cooling may be performed, more gradual cooling than natural cooling may be performed, and the sintered compact may be kept at a given temperature during cooling.

Then, a description will be given to an all-solid-state battery of the present disclosure.

The all-solid-state battery generally has a positive electrode, a negative electrode, an electrolyte comprising an ion conductive solid arranged between the positive electrode and the negative electrode, and if required, a collector.

The all-solid-state battery of the present disclosure is an all-solid-state battery comprising at least:

a positive electrode;

a negative electrode; and an electrolyte, wherein at least one selected from the group consisting of the positive electrode, the negative electrode, and the electrolyte comprises the ion conductive solid of the present disclosure.

The all-solid-state battery of the present disclosure may be a bulk-type battery, or may be a thin-film battery. The specific shape of the all-solid-state battery of the present disclosure is not particularly limited, but examples of the shape include coin, button, sheet, and layered shapes.

The all-solid-state battery of the present disclosure comprises the electrolyte. In the all-solid-state battery of the present disclosure, at least the electrolyte preferably comprises the ion conductive solid of the present disclosure.

The solid electrolyte in the all-solid-state battery of the present disclosure may comprise the ion conductive solid of the present disclosure, may comprise other ion conductive solids, and may comprise an ion liquid and a gel polymer. The other ion conductive solid is not particularly limited but may comprise an ion conductive solid that is usually used in an all-solid-state battery, for example, LiI, $Li_3PO_4$, $Li_7La_3Zr_2O_{12}$, or the like. The content of the ion conductive solid of the present disclosure in the electrolyte in the all-solid-state battery of the present disclosure is preferably 25 mass % or higher, more preferably 50 mass % or higher, still more preferably 75 mass % or higher, and particularly preferably 100 mass %.

The all-solid-state battery of the present disclosure has a positive electrode. The positive electrode may include a positive electrode active material, and may include the positive electrode active material and the ion conductive solid of the present disclosure. As the positive electrode active material, a known positive electrode active material such as a sulfide comprising a transition metal element, or an oxide including lithium and a transition metal element can be used without particular limitation.

Further, the positive electrode may include a binder, an electroconductive agent, and/or the like. Examples of the binder include polyvinylidene fluoride, polytetrafluoroethylene, and polyvinyl alcohol. Examples of the electroconductive agent include natural graphite, artificial graphite, acetylene black, and ethylene black.

The all-solid-state battery of the present disclosure includes the negative electrode. The negative electrode may include the negative electrode active material and the ion conductive solid of the present disclosure. As the negative electrode active material, a known negative electrode active material such as an inorganic compound such as lithium, a lithium alloy, or a tin compound, a carbonaceous material that can absorb and release a lithium ion, or a conductive polymer can be used without particular limitation.

Further, the negative electrode may include a binder, an electroconductive agent, and/or the like. As the binder and the electroconductive agent, binders and electroconductive agents similar to those mentioned in the positive electrode can be used.

Herein, the electrode "include" the electrode active material denotes that the electrode has the electrode active material as a component/element/property. For example, the case where the electrode active material is included in the electrode, and the case where the electrode active material is coated on the electrode surface also correspond to the "include".

The positive electrode and the negative electrode can be obtained by a known method such as mixture, molding, heat treatment, or the like of starting materials. It is considered that, as a result, the ion conductive solid enters gaps and the like between such electrode active materials, to facilitate security of a conduction path for lithium ions. It is considered that the formation of a high-resistant phase generated by reaction between the ion conductive solid and the electrode active material can be suppressed because the ion conductive solid of the present disclosure can be produced by heat treatment at low temperature as compared to conventional technologies.

The above-described positive electrode and the above-described negative electrode may include the current collector. As the current collector, a known current collector such as aluminum, titanium, stainless steel, nickel, iron, baked carbon, a conductive polymer, or electrically conductive glass can be used. In addition, aluminum, copper, or the like, of which a surface is treated with carbon, nickel, titanium, silver, or the like for the purpose of improving adhesiveness, electrical conductivity, oxidation resistance, and the like, can be used as the current collector.

The all-solid-state battery of the present disclosure can be obtained by a known method in which, for example, the positive electrode, the solid electrolyte, and the negative electrode are layered, molded, and heat-treated. It is considered that the formation of a high-resistant phase generated by reaction between the ion conductive solid and the electrode active material can be suppressed because the ion conductive solid of the present disclosure can be produced by heat treatment at low temperature as compared to conventional technologies. Thus, it is considered that the all-solid-state battery superior in output characteristics can be obtained.

A method of measuring the composition and each physical property according to the present disclosure will now be described.

Method of Identification and Analyzing of Hf, Zr and Ce

The analysis of the composition of the ion conductive solid is performed by wavelength dispersion type fluorescent X-ray analysis (hereinafter also referred to as "XRF") using a sample solidified by a pressure-molding method. However, when the analysis is difficult due to a particle size effect and/or the like, it is preferable to vitrify the ion conductive solid by a glass bead technique, and to analyze the composition thereof by XRF. When the peak of yttrium and the peaks of Hf, Zr and Ce overlap with each other in XRF, the composition analysis is preferably performed by inductively coupled plasma atomic emission spectrochemical analysis (ICP-AES).

In the case of XRF, ZSX Primus II manufactured by Rigaku Corporation is used as an analysis apparatus. The conditions of the analysis are set at use of Rh as the negative electrode of an X-ray tube, vacuum atmosphere, an analysis diameter of 10 mm, an analysis range of 17 deg to 81 deg, a step of 0.01 deg, and a scanning speed of 5 sec/step. Moreover, the detection is performed by a proportional counter in the case of measuring a light element, while the detection is performed by a scintillation counter in the case of measuring a heavy element.

An element is identified based on the peak position of a spectrum obtained in XRF, and molar concentration ratios Y/Hf, Y/Zr, and Y/Ce are calculated based on a counting rate (unit: cps) which is the number of X-ray photons per unit time, to determine x, y, and z.

Measurement of X-Ray Diffraction Peak, and Calculation of Lattice Volume

D8 ADVANCE manufactured by BrukerAXS is used in the X-ray diffraction analysis of the ion conductive solid.

The X-ray diffraction analysis (XRD) is performed using a CuKα ray source with an analytical sample obtained by putting, in a holder, a powder obtained by pulverizing the ion conductive solid with a mortar and a pestle, and then pressing a glass flat plate against the powder from above to evenly spread the powder.

Temperature is set at room temperature (25° C.), an analysis range is set at 10 deg to 70 deg, a step is set at 0.007, and a scanning speed is set at 0.1 step/second.

In a diffraction curve obtained in XRD, 2θ of a peak top generated at $2\theta = 28.000 \pm 0.200$ deg derived from $Li_6YB_3O_9$ is determined as a peak position.

The lattice volume of a crystal phase is calculated using the diffraction curve obtained in XRD and structural analysis software TOPAS manufactured by BrukerAXS. The lattice volume is calculated by fitting and analyzing, by TOPAS, the diffraction curve obtained in XRD and the diffraction pattern of the crystal phase having a monoclinic crystal structure.

EXAMPLES

Examples in which the ion conductive solid of the present disclosure was specifically produced and evaluated are described below as Examples. The present disclosure is not limited to the following Examples.

Example 1

Primary Baking Step

Using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), and $HfO_2$ (manufactured by New Metals and Chemicals Corporation, purity 99.9%) as starting materials, the respective starting materials were weighed in their respective stoichiometric amounts so as to achieve $Li_{5.990}Y_{0.990}Hf_{0.010}B_3O_9$, and were mixed at a disk rotation number of 300 rpm with a planetary mill P-7 manufactured by Fritsch Japan Co., Ltd. for 30 minutes. For the planetary mill, the balls made of zirconia and with a diameter of 5 mm and a 45-mL container were used.

After mixing, the mixed powder was subjected to cold uniaxial molding at 147 MPa using a 100 kN electric press P3052-10 manufactured by NPa SYSTEM CO., LTD., and was baked in an atmospheric atmosphere. The heating temperature was set at 650° C., and the retention time was set at 720 minutes.

The resulting ion conductive solid comprising the oxide was pulverized at a disk rotation number of 230 rpm with a planetary mill P-7 manufactured by Fritsch Japan Co., Ltd. for 180 minutes, thereby producing a powder of the ion conductive solid comprising the oxide.

Secondary Baking Step

A powder of the ion conductive solid comprising an oxide obtained as described above was subjected to molding, and secondary baking, thereby producing a sintered compact of the ion conductive solid comprising the oxide of Example 1.

The secondary baking was carried out in an atmospheric atmosphere, and the heating temperature was set at 650° C., and the retention time was set at 720 minutes.

Examples 2 to 6

A sintered compact of each ion conductive solid including an oxide of Examples 2 to 6 was manufactured by the same step as that of Example 1, except for weighing the respective starting materials in their respective stoichiometric amounts so that x may become the value described in Table 1.

Example 7

A sintered compact of an ion conductive solid including an oxide of Example 7 was manufactured by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $HfO_2$ (manufactured by New Metals and Chemicals Corporation, purity 99.9%), and $ZrO_2$ (manufactured by NIPPON DENKO CO., LTD., purity 99.9%) as starting materials, the respective starting materials were weighed in their respective stoichiometric amounts so as to achieve $Li_{5.775}Y_{0.775}Hf_{0.025}Zr_{0.200}B_3O_9$.

Example 8

A sintered compact of an ion conductive solid including an oxide of Example 8 was manufactured by the same step as that of Example 7, except for weighing the respective starting materials in their respective stoichiometric amounts so that x and y may become the respective values described in Table 1.

Example 9

A sintered compact of an ion conductive solid including an oxide of Example 9 was manufactured by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $HfO_2$ (manufactured by New Metals and Chemicals Corporation, purity 99.9%), and $CeO_2$ (manufactured by Shin-Etsu Chemical Co., Ltd., purity 99.9%) as starting materials, the respective starting materials were weighed in their respective stoichiometric amounts so as to achieve $Li_{5.775}Y_{0.775}Hf_{0.025}Ce_{0.200}B_3O_9$.

Examples 10 and 11

A sintered compact of each ion conductive solid including an oxide of Examples 10 and 11 was manufactured by the same step as that of Example 9, except for weighing the respective starting materials in their respective stoichiometric amounts so that x and z may become respective values described in Table 1.

Example 12

A sintered compact of an ion conductive solid including an oxide of Example 12 was manufactured by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $Y_2O_3$ (manufactured by Shin-Etsu Chemical Co., Ltd., purity 99.9 mass %), $HfO_2$ (manufactured by New Metals and Chemicals Corporation, purity 99.9%), $ZrO_2$ (manufactured by NIPPON DENKO CO., LTD., purity 99.9%), and $CeO_2$ (manufactured by Shin-Etsu Chemical Co., Ltd., purity 99.9%) as starting materials, the respective starting materials were weighed in their respective stoichiometric amounts so as to achieve $Li_{5.875}Y_{0.875}Hf_{0.075}Zr_{0.025}Ce_{0.025}B_3O_9$.

Examples 13 and 14

A sintered compact of each ion conductive solid including an oxide of Examples 13 and 14 was manufactured by the same step as that of Example 12, except for weighing the respective starting materials in their respective stoichiometric amounts so that x, y and z may become respective values described in Table 1.

Comparative Example 1

Primary Baking Step

An ion conductive solid and a powder of the ion conductive solid were produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), and $Y_2O_3$ (manufactured by Shin-Etsu Chemical Co., Ltd., purity 99.9 mass %) as starting materials, the respective starting materials were weighed in their respective stoichiometric amounts so as to achieve $Li_6YB_3O_9$.

Secondary Baking Step

The powder of the ion conductive solid obtained above was subjected to molding with spark plasma sintering (SPS), and secondary baking, thereby producing a sintered compact of an ion conductive solid comprising an oxide of Comparative Example 1. The heating temperature was set at 700° C., the pressure was set at 30 MPa, and the retention time was set at 10 minutes.

Comparative Example 2

Primary Baking Step

A solid and a powder of the solid were produced by the same step as that of Example 1, except that, using $Li_3BO_3$ (manufactured by TOSHIMA MANUFACTURING CO., LTD., purity 99.9 mass %), $H_3BO_3$ (manufactured by KANTO CHEMICAL CO., INC., purity 99.5%), $ZrO_2$ (manufactured by NIPPON DENKO CO., LTD., purity 99.9%), and $CeO_2$ (manufactured by Shin-Etsu Chemical Co., Ltd., purity 99.9%) as starting materials, the respective starting materials were weighed in their respective stoichiometric amounts so as to achieve $Li_{5.000}Zr_{0.800}Ce_{0.200}B_3O_9$.

Secondary Baking Step

The powder of the solid obtained above was subjected to molding, and secondary baking, thereby producing a sintered compact comprising an oxide of Comparative Example 2. The secondary baking was carried out in an atmospheric atmosphere, the heating temperature was set at 550° C., and the retention time was set at 720 minutes.

The sintered compact of each ion conductive solid comprising an oxide of Examples 1 to 14 was subjected to composition analysis by the method. Further, for each sintered compact of each ion conductive solid comprising an oxide of Examples 1 to 14, the measurement of the X-ray diffraction peak and calculation of the lattice volume were performed. Still further, for the sintered compact of Examples 1 to 14, and Comparative Examples 1 and 2, the measurement of the ion conductivity was performed in the following manner.

The measurement method of the ion conductivity will be described below. Further, the obtained evaluation results are shown in Tables 1 and 2.

Measurement of Ion Conductivity

The two surfaces facing each other in parallel with each other, and each having a large area of the flat sheet-shaped sintered compact of the ion conductive solid comprising an oxide obtained by the secondary baking were polished with sandpaper. The dimensions of the flat sheet-shaped sintered compact of the ion conductive solid comprising an oxide can be set at, for example, 0.9 cm×0.9 cm×0.05 cm, but the dimensions are not limited thereto. Polishing was performed first at #500 for 15 minutes to 30 minutes, and then, at #1000 for 10 minutes to 20 minutes. Finally, polishing was performed at #2000 for 5 minutes to 10 minutes. When there are no visually noticeable unevenness and scratches on the polished surface, polishing was regarded as having been completed.

After polishing, using a sputtering apparatus SC-701MkII ADVANCE manufactured by SANYU ELECTRON CO., LTD., gold was deposited on the polished surface of the sintered compact of the ion conductive solid comprising an oxide. The deposition conditions were set for a measurement sample such that the process gas was Ar, the degree of vacuum was 2 Pa to 5 Pa, and the deposition time was 5 minutes. After deposition, alternating impedance measurement of the measurement sample was performed.

For the impedance measurement, an impedance/gain-phase analyzer SI1260 and a dielectric interface system 1296 (both manufactured by Solartron Co.) were used, and the measurement conditions were set such that the temperature was 27° C., the amplitude was 20 mV, and the frequency was 0.1 Hz to 1 MHz.

The resistance of the sintered compact of the ion conductive solid comprising an oxide was calculated using the Nyquist plot obtained by the impedance measurement, and software ZVIEW manufactured by Scribner Co. With the ZVIEW, the equivalent circuit corresponding to the measurement sample was set, and the equivalent circuit and the Nyquist plot were subjected to fitting and analysis, thereby calculating the resistance of the sintered compact of the ion conductive solid comprising an oxide. Using the calculated resistance, the thickness of the sintered compact of the ion conductive solid comprising an oxide, and the electrode area, the ion conductivity was calculated from the following equation.

Ion conductivity(S/cm)=thickness(cm) of sintered compact of ion conductive solid comprising oxide/(resistance(Ω) of sintered compact of ion conductive solid comprising oxide×electrode area($cm^2$))

Results

Table 1 summarizes the stoichiometric amounts (the values of x, y, and z in Formula $Li_{6-x-y-z}Y_{1-x-y-z}Hf_xZr_yCe_zB_3O_9$) and the ion conductivity of the starting materials for producing the sintered compact of each ion conductive solid comprising an oxide of Examples 1 to 14 and Comparative Examples 1 and 2. Further, Table 2 summarizes the diffraction peak position and the lattice volume in each sintered compact obtained in Examples 1 to 14.

As a result of the composition analysis, it has been confirmed that all the sintered compacts of the ion conductive solids each comprising an oxide of Examples 1 to 14 and Comparative Example 1 have the compositions as the stoichiometric amounts shown in Table 1. Further, the sintered compact of each ion conductive solid comprising an oxide of Examples 1 to 14 was an ion conductive solid exhibiting a high ion conductivity even when baked at a temperature of less than 700° C. On the other hand, the main crystalline structure of the sintered compact of Comparative Example 2 was the one comprising $ZrO_2$ and $CeO_2$ used as the starting materials mixed therein.

[Table 1]

TABLE 1

| | $Li_{6-x-y-z}Y_{1-x-y-z}Hf_xZr_yCe_zB_3O_9$ | | | | Ion conductivity |
|---|---|---|---|---|---|
| | x | y | z | x + y + z | (S/cm) |
| Comparative Example 1 | 0.000 | 0.000 | 0.000 | 0.000 | $5.61 \times 10^{-11}$ |
| Comparative Example 2 | 0.000 | 0.800 | 0.200 | 1.000 | ※1 |
| Example 1 | 0.010 | 0.000 | 0.000 | 0.010 | $1.31 \times 10^{-6}$ |
| Example 2 | 0.025 | 0.000 | 0.000 | 0.025 | $7.84 \times 10^{-6}$ |
| Example 3 | 0.100 | 0.000 | 0.000 | 0.100 | $5.12 \times 10^{-6}$ |
| Example 4 | 0.200 | 0.000 | 0.000 | 0.200 | $1.05 \times 10^{-7}$ |
| Example 5 | 0.400 | 0.000 | 0.000 | 0.400 | $4.87 \times 10^{-8}$ |
| Example 6 | 0.800 | 0.000 | 0.000 | 0.800 | $3.11 \times 10^{-9}$ |
| Example 7 | 0.025 | 0.200 | 0.000 | 0.225 | $9.33 \times 10^{-6}$ |
| Example 8 | 0.025 | 0.400 | 0.000 | 0.425 | $9.17 \times 10^{-7}$ |
| Example 9 | 0.025 | 0.000 | 0.200 | 0.225 | $2.26 \times 10^{-6}$ |
| Example 10 | 0.025 | 0.000 | 0.400 | 0.425 | $1.08 \times 10^{-7}$ |
| Example 11 | 0.100 | 0.000 | 0.025 | 0.125 | $5.33 \times 10^{-6}$ |
| Example 12 | 0.075 | 0.025 | 0.025 | 0.125 | $6.85 \times 10^{-6}$ |
| Example 13 | 0.050 | 0.050 | 0.025 | 0.125 | $6.72 \times 10^{-6}$ |
| Example 14 | 0.025 | 0.075 | 0.025 | 0.125 | $1.40 \times 10^{-5}$ |

In the table, "*1" in the column of "Ionic conductivity" shows that it was impossible to measure an ionic conductivity due to high resistance.

TABLE 2

| | $Li_{6-x-y-z}Y_{1-x-y-z}Hf_xZr_yCe_zB_3O_9$ | | | | Peak | Lattice |
|---|---|---|---|---|---|---|
| | x | y | z | x + y + z | position 2θ (°) | volume (Å$^3$) |
| Example 1 | 0.010 | 0.000 | 0.000 | 0.010 | 27.99 | 755.49 |
| Example 2 | 0.025 | 0.000 | 0.000 | 0.025 | 27.99 | 754.56 |
| Example 3 | 0.100 | 0.000 | 0.000 | 0.100 | 27.98 | 754.02 |
| Example 4 | 0.200 | 0.000 | 0.000 | 0.200 | 28.01 | 754.22 |
| Example 5 | 0.400 | 0.000 | 0.000 | 0.400 | 28.01 | 755.63 |
| Example 6 | 0.800 | 0.000 | 0.000 | 0.800 | ※2 | — |
| Example 7 | 0.025 | 0.200 | 0.000 | 0.225 | 27.99 | 754.69 |
| Example 8 | 0.025 | 0.400 | 0.000 | 0.425 | 28.00 | 754.58 |
| Example 9 | 0.025 | 0.000 | 0.200 | 0.225 | 28.02 | 755.06 |
| Example 10 | 0.025 | 0.000 | 0.400 | 0.425 | 28.03 | 755.76 |
| Example 11 | 0.100 | 0.000 | 0.025 | 0.125 | 28.02 | 753.74 |
| Example 12 | 0.075 | 0.025 | 0.025 | 0.125 | 28.01 | 753.58 |
| Example 13 | 0.050 | 0.050 | 0.025 | 0.125 | 27.99 | 753.55 |
| Example 14 | 0.025 | 0.075 | 0.025 | 0.125 | 28.02 | 753.55 |

The "*2" in the row of the peak position indicates that no peaks are observed within the range of 2θ = 27.50° to 28.50°. The "—" in the row of the lattice volume indicates that no data has been acquired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ion conductive solid comprising an oxide represented by formula $Li_{6-x-y-z}Y_{1-x-y-z}Hf_xZr_yCe_zB_3O_9$, wherein in the formula, x is $0.005 \leq x \leq 0.800$, y is $0.000 \leq y \leq 0.400$, z is $0.000 \leq z \leq 0.400$, and x, y, and z are real numbers satisfying $0.005 \leq x+y+z < 1.000$.

2. The ion conductive solid according to claim 1, wherein the x is $0.010 \leq x \leq 0.800$.

3. The ion conductive solid according to claim 1, wherein the x is $0.010 \leq x \leq 0.400$.

4. The ion conductive solid according to claim 1, wherein the x is $0.010 \leq x \leq 0.100$.

5. The ion conductive solid according to claim 1, wherein the x+y+z is $0.010 \leq x+y+z \leq 0.900$.

6. The ion conductive solid according to claim 1, wherein the x+y+z is $0.010 \leq x+y+z \leq 0.400$.

7. An all-solid-state battery comprising at least:

a positive electrode;

a negative electrode; and an electrolyte, wherein at least one selected from the group consisting of the positive electrode, the negative electrode, and the electrolyte comprises the ion conductive solid according to claim 1.

8. The all-solid-state battery according to claim 7, wherein at least the electrolyte comprises the ion conductive solid.

* * * * *